United States Patent
Gericke

[15] 3,698,240
[45] Oct. 17, 1972

[54] ELECTRONIC CIRCUIT FOR PREVENTION OF RECEIVER PARALYSIS IN ULTRASONIC ECHO RANGING

[72] Inventor: Otto R. Gericke, Medfield, Mass.

[73] Assignee: The United States of America as represented by the Secretary of the Army

[22] Filed: Sept. 29, 1971

[21] Appl. No.: 184,741

[52] U.S. Cl.................................................73/67.9
[51] Int. Cl..............................................G01n 29/04
[58] Field of Search........................73/67.8 R, 67.9

[56] References Cited

UNITED STATES PATENTS

| | | | |
|---|---|---|---|
| 2,549,895 | 4/1951 | De Lano, Jr. | 73/67.9 |
| 2,651,012 | 9/1953 | Van Valkenburg et al. | 73/67.9 X |
| 3,285,059 | 11/1966 | Bogle | 73/67.9 |

*Primary Examiner*—James J. Gill
*Attorney*—Harry M. Saragovitz et al.

[57] ABSTRACT

A pulse-echo instrument wherein a balanced modulator is d.c. biased to pass a.c. signals is coupled between the transducer and wide-band amplifier of the instrument. The balanced modulator is also biased by a rectangular pulse having the amplitude and width of the excitation pulse applied to a transducer and the input of the balanced modulator, but of opposite polarity to the d.c. bias. This rectangular pulse is applied to the balance modulator coincidentally with the excitation pulse whereby the output of the balanced modulator is held at ground optential for the duration of the excitation pulse thereby preventing current flow in the output of the balanced modulator during the duration of the excitation pulse whereby paralysis of the wide-band amplifier by the excitation pulse is prevented.

3 Claims, 4 Drawing Figures

INVENTOR
OTTO R. GERICKE

ELECTRONIC CIRCUIT FOR PREVENTION OF RECEIVER PARALYSIS IN ULTRASONIC ECHO RANGING

The invention described herein may be manufactured, used and licensed by or for the Government of the United States of America for governmental purposes without the payment to me of any royalty thereon.

The invention relates to ultrasonic pulse-echo tests instruments and more particularly for the purpose of reducing the amplitude of initially transmitted pulses at the input of a high gain wide-band amplifier normally used in such instruments.

In a typical pulse-echo instrument incorporating a wide-band amplifier, the pulse generated by the pulse generator for exciting the transducer is simultaneously applied to the transducer and the wide-band amplifier resulting in overloading and temporary paralysis of the amplifier with the subsequent delay in reception of the echo signals.

In the pulse-echo test instrument of the invention there is coupled between the transmitter pulse generator and a wide-band amplifier, a balanced modulator employing a diode bridge which is provided with a d.c. bias whereby the input and output transformers thereof are coupled permitting the passage of a.c. signals through the balanced modulator. Means are provided to apply a pulse of opposite polarity to the d.c. bias across the output of the bridge wherein it is mixed with the pulse of the transmitter pulse applied to the input of the diode bridge. The pulse of opposite polarity which has the same amplitude and duration as that of the transmitter pulse is generated by another pulse generator which is triggered by the transmitter pulse generator to enable complete coincidence of these pulses. Under these conditions, the two pulse signals will compensate each other in the balanced modulator and only a slight residual signal will appear at the input of the wide-band amplifier. The d.c. bias ensures that the ultrasonic signals which follow the transmitter pulse will be passed by the modulator to the wide-band amplifier.

Accordingly an object of the invention is a pulse-echo test instrument wherein there is incorporated new and novel means for the purpose of reducing the amplitude of initially transmitted pulses at input of the high gain wide-band amplifier thereof.

Another object of the invention is a pulse-echo test instrument wherein there is incorporated a balanced time-gated modulator coupled between the pulse generating means and wide-band amplifying means thereof whereby the pulses generated by the pulse generating means are prevented from paralyzing the wide-band amplifying means.

A further object of the invention is a pulse-echo test instrument having incorporated therein a pulse suppression means between the pulse generating means and amplifying means thereof which does not produce switching transients which would cause paralysis of the wide-band amplifier utilized in such test instrument.

A still further object of the invention is a pulse-echo test instrument having incorporated therein a pulse suppression means between the pulse generating means and amplifying means thereof which does not effect the echo signals following the transmitted pulse even if their amplitudes are relatively large.

The invention will be more fully understood and its objects and advantages further appreciated by referring now to the detailed description taken in conjunction with the drawings in which.

Figure 1:
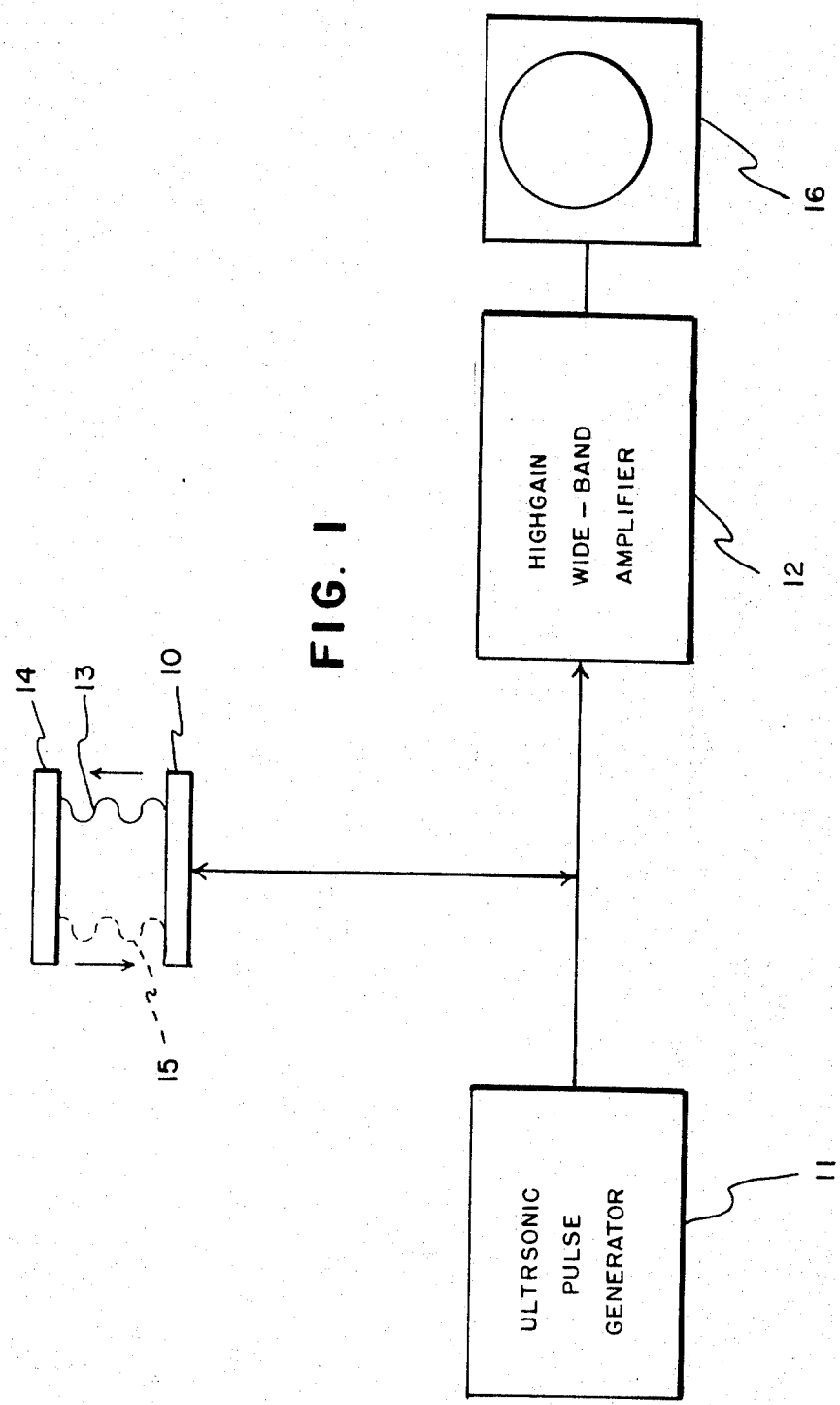
FIG. 1 is a block diagram of a typical ultrasonic pulse-echo instrument.

Referring now to FIG. 1 in the drawings which is a block diagram of a typical ultrasonic pulse-echo instrument, a piezoelectric transducer 10 is excited by an ultrasonic pulse generator 11 connected thereto and to the input of the wide-band high gain amplifier 12 whereby the pulse generated by generator 11 is simultaneously appled to transducer 10 and amplifier 12. The transducer 10 thus excited transmits a pulse of ultrasonic energy 13 in the frequency range of, for instance, 3–10 mhz, which when coupled to a specimen 14 ultrasonically energizes it and picks up the ultrasonic echoes 15 returning from the specimen which are applied to the input of amplifier 12, the output of which is connected to an oscilloscope 16 for display of the spectrum of pulse and echo signals. In this arrangement it is to be noted that the wide-band amplifier 10 is paralized by the transmitted pulse thereby prohibiting amplification of the echo signals immediately following the transmitted pulse.

Figure 2:
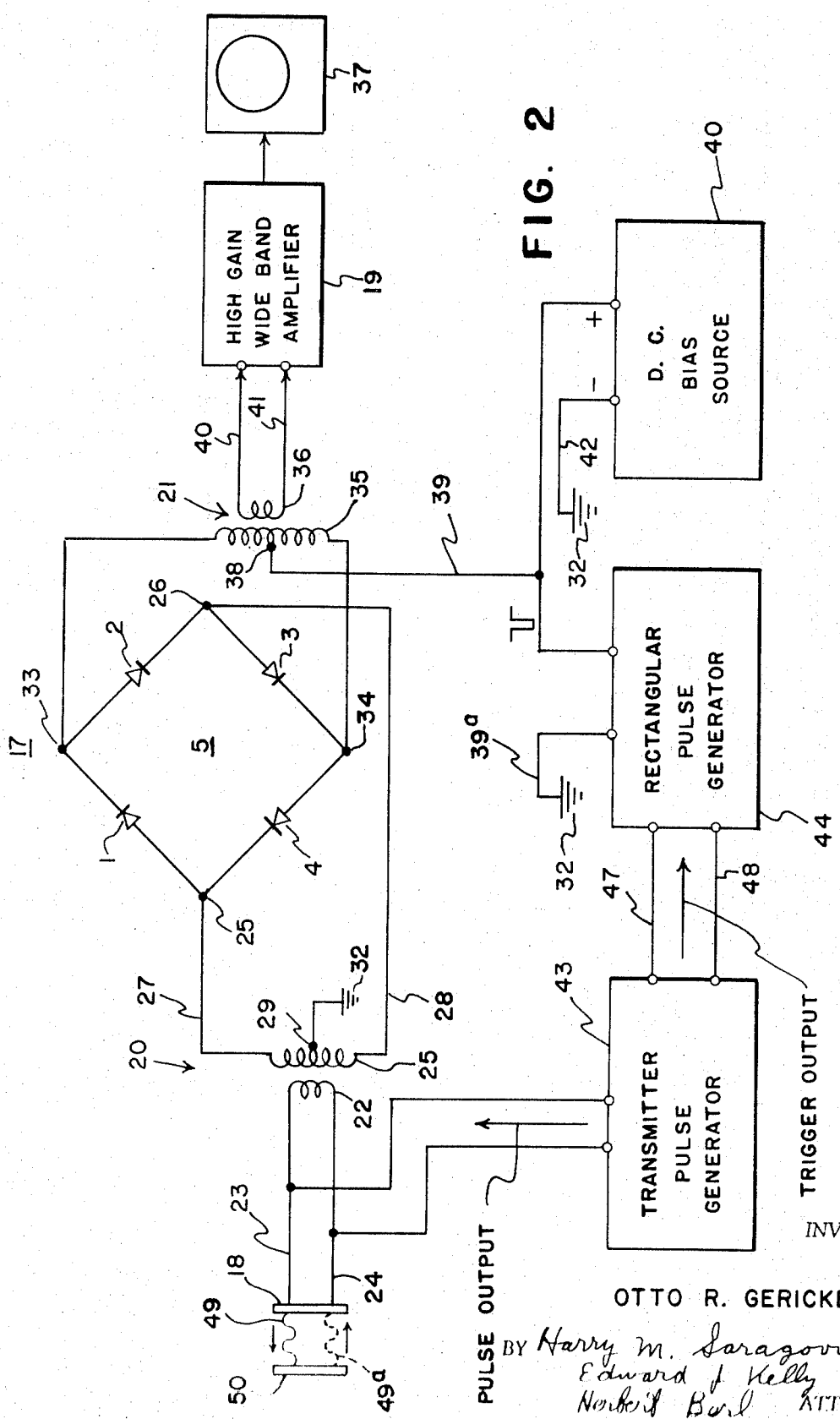
FIG. 2 is a block schematic diagram of the invention.

FIG. 2 is a schematic-block diagram illustrating a preferred embodiment of an ultrasonic pulse-instrument embodying the invention wherein the amplitude of the ultrasonic transmitter pulse at the input of the high gain amplifier is significantly reduced without affecting the amplitude of the echo signals picked up by the transducer subsequent the emission of the initial ultrasonic pulse. A balanced modulator 17 employing a diode bridge 5 consisting of identical diodes 1, 2, 3 and 4 is coupled between the piezoelectric transducer 18 and the high gain wide-band amplifier 19 through its wide-band input transformer 20 and its wide-band output transformer 21, respectively. Wide-band input transformer 20 consists of a primary winding 22 connected to the piezoelectric transducer 18 by means of conductors 23 and 24 and a secondary winding 25 connected across the input terminals 25 and 26 of the diode bridge 5 by means of conductors 27 and 28 and provided with a center tap 29 connected to ground 32. Wide-band output transformer 21 consists of a transformer 21 consists of a primary winding 35 connected across the output terminals 33 and 34 of diode bridge 5 and secondary winding 36 which is coupled by means conductor 40 and 41 to the input of the high gain wide-band amplifier 19 whose output is coupled to oscilloscope means 37 for spectrum display of the signals passed through modulator 17. The primary winding 35 is also provided with a center tap 38 coupled by means of conductor 39 to one pole of a d.c. bias source 40 which has another pole connected by means of conductor 42 to ground 32 whereby a d.c. bias is applied between the output and input of diode ring 5 through the secondary winding 35 and primary winding 25 rendering the diode bridge 5 conductive whereby a.c. signals applied to the input of balanced modulator 17 are passed therethrough to high gain wide-band amplifier 19.

The transmitter-pulse generator 43 when activated simultaneously produces an excitation pulse in the ultrasonic range for energizing piezoelectric transducer 18 and a trigger pulse for triggering a rectangular pulse generator 44 which is provided with adjustable means so that the width of its pulse, which is applied between the output and input of diode bridge 5 as described in conjunction with the d.c. bias, may be adjusted to the width of the excitation pulse and its amplitude adjusted so that the ratio of the amplitudes of the excitation pulse and rectangular pulse, applied across the input of balance modulator 17, for maximum reduction of excitation pulse amplitude across the output of balanced modulator 17.

The excitation pulse of transmitter-pulse generator 43 is coupled by means of conductors 23 and 24 to the piezoelectric transducer 18 and the input of balanced modulator 17 via input transformer 20. The trigger output of transmitter-pulse generator 43 is coupled to the input of rectangular pulse generator 44 by means of conductors 47 and 48. The rectangular output of pulse generator 44 is coupled to center taps 38 and 29 of the output transformers 21 and 20, respectively, by means of conductors 39 and 39a whereby it is applied between the output and input of diode bridge 5. When a positive d.c. bias is utilized to open the modulator 17, as shown in FIG. 2, the polarity of the rectangular output pulse of generator 44 preventing passage of the excitation pulse through the modulator is selected to be negative. However, when a negative d.c. bias is employed to open the modulator 17, the polarity of rectangular pulse of generator is selected to be positive.

In operation, the positive d.c. bias is constantly applied between the output and input of the balanced modulator 17 whereby diodes 2 and 4 are forward biased and conduct substantial current. Since diodes 2 and 4 are therefore in the ON condition the secondary winding 25 of wide-band transformer 20 is connected to the primary winding 35 of wide-band transformer 21 and the modulator will pass a.c. signals. When transmitter-pulse generator 43 is activated it simultaneously generates a rectangular excitation pulse which is applied to the input of modulator 17 and piezoelectric transducer 18, and a trigger signal which triggers pulse generator 44 which in response thereto applies across the balanced modulator a rectangular negative pulse having the same amplitude and width as that of the excitation pulse measured across the output terminals 33 and 34 of the diode bridge 5. The excitation pulse energizes piezoelectric transducer 18 whereupon the transducer injects an ultrasonic pulse 49 of short duration into a specimen, for example, a metal plate 50. After entering metal plate 50, the ultrasonic pulse is repeatedly reflected back and forth between the parallel surfaces of the plate until its energy is dissipated. During this reverberation process, piezoelectric transducer 18 acts as an ultrasonic receiver generating a short voltage pulse in response to the ultrasonic echo 49a generated in the specimen, each time the ultrasonic pulse strikes upon the specimen surface to which the piezoelectric transducer is coupled. Thus, following the emission of the initial excitation pulse, a sequence of electrical pulses is produced by the piezoelectric transducer and applied to the input of the balanced modulator. Thus, from the foregoing it can be seen that upon the application of the rectangular negative pulse between the output and input of the balanced modulator the positive d.c. bias is counteracted and the output circuit of the balanced modulator is held at ground potential for the period of the negative pulse. Under these conditions the a.c. signal developed across the secondary winding 25 of input wide-band transformer 20, due to coupling the excitation pulse to the primary winding 22 thereof, will only flow through diodes 1 and 2 to ground 32 during its positive cycle and through diodes 3 and 4 to ground 32 during its negative cycle. Since these diodes have identical characteristics a 50 percent voltage drop is encountered at the output terminals 33 and 34 of diode bridge 5 which are connected to the primary winding 35 of the wide-band output transformer 21. This voltage level corresponds to the potential at the center tap 29 of secondary winding 25 of the wide-band input transformer which is the ground potential. Since the center tap 35 of wide-band output transformer is also held at ground potential for the duration of the negative rectangular pulse there will be no current flow through the wide-band output transformer 21 and hence no paralizing signal to the input of high-gain wide-band amplifier 19. After the period of the rectangular negative pulse has passed, the d.c. bias is restored and modulator 17 is opened and thereby passes the signals produced by piezoelectric transducer 18 in response to the ultrasonic echoes to the high gain wide-band amplifier 19, the output of which is coupled to oscilloscope means 37 for spectrum display of the signals representative of the ultrasonic echoes.

Figure 3:
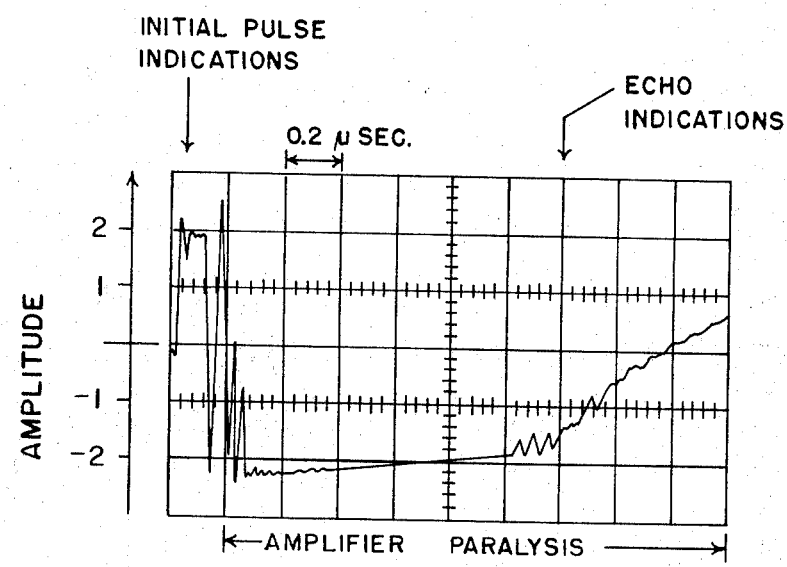
FIG. 3 is a drawing of an oscilloscope trace illustrating the amplifier paralysis in a typical pulse-echo instrument.
Figure 4:
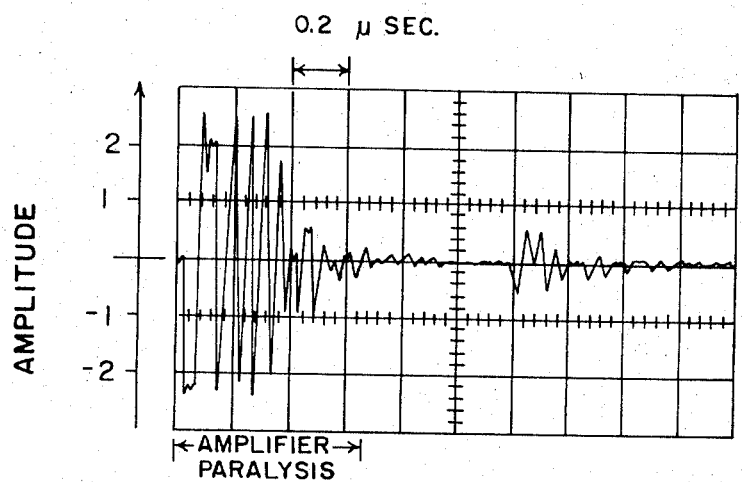
FIG. 4 is a drawing of an oscilloscope trace illustrating the reduction of amplifier paralysis obtained through use of the invention.

FIGS. 3 and 4 illustrate the effect the invention has on the signal trace displayed by a typical pulse-echo instrument incorporating a wide-band amplifier. Analysis of the signal trace of FIG. 3 obtained utilizing a typical pulse-echo instrument not incorporating the invention shows that the transmitter pulse overloads and paralyses the wide-band amplifier for about 2 microseconds. Analysis of the signal trace of FIG. 4 obtained through use of the same instrument but incorporating the invention shows that the dead time of the instrument has been reduced to 0.6 microseconds.

I claim:

1. In a pulse-echo instrument as described, the improvement comprising means for preventing paralysis of the wide-band amplifier utilized therein comprising in combination:

a balanced modulator having a d.c. bias coupled between the input and output thereof;

a piezoelectric transducer coupled to the input of said balanced modulator and to a specimen;

an ultrasonic generator providing simultaneously an ultrasonic rectangular pulse, and a trigger pulse;

means coupling the ultrasonic rectangular pulse to the input of the balanced modulator and to the said transducer which in response the ultrasonic rectangular pulse ultrasonically energizes the specimen and detects and converts the ultrasonic echoes returning from the specimen into electrical pulse signals which are coupled to the input of the balanced modulator, and means coupling said trigger pulse to means for applying between the input and output of the balanced modulator a rectangular bias pulse having the same amplitude and duration as the ultrasonic rectangular pulse but of opposite polarity to the polarity of said d.c. bias whereby said output is connected to ground potential substantially eliminating the passage of the ultrasonic rectangular pulse through said output;

a high gain wide-band amplifier coupled to the output of said balanced modulator for amplifying said electrical pulse signals which follow the ultrasonic rectangular pulse through the balanced modulator; and oscilloscope means coupled to the output of said high gain wide-band amplifier for spectrum display of said electrical pulse signals.

2. The invention in accordance with claim 1 wherein said balanced modulator comprises a wide band input transformer consisting of a primary winding coupled to said transducer and ultrasonic generator and a center tapped secondary winding coupled across the input diagonal of a diode bridge, and a wide band output transformer consisting of a center tapped primary coupled across the output diagonal of said diode bridge and a secondary winding coupled to the input of said high gain wide-band amplifier, and wherein said d.c. bias and said rectangular pulse bias are coupled in parallel between said center taps, said d.c. bias biasing the diode bridge into a conductive state whereby the secondary winding of said input transformer and the primary winding of said output transformer are coupled enabling the passage of said electrical pulse signals through the balanced modulator.

3. The invention in accordance with claim 2 wherein said means for applying between the input and output of the balanced modulator a rectangular bias pulse comprise a rectangular pulse generator having its output coupled between said center taps and its input coupled to the trigger pulse output of the transmitter-pulse generator whereby the rectangular pulse generator is simultaneously triggered with the generation of the ultrasonic rectangular pulse coupled to said tranducer and input of the balanced modulator.

* * * * *